Feb. 19, 1963     P. RICHTER     3,078,075
LINE PULLER
Filed June 3, 1960
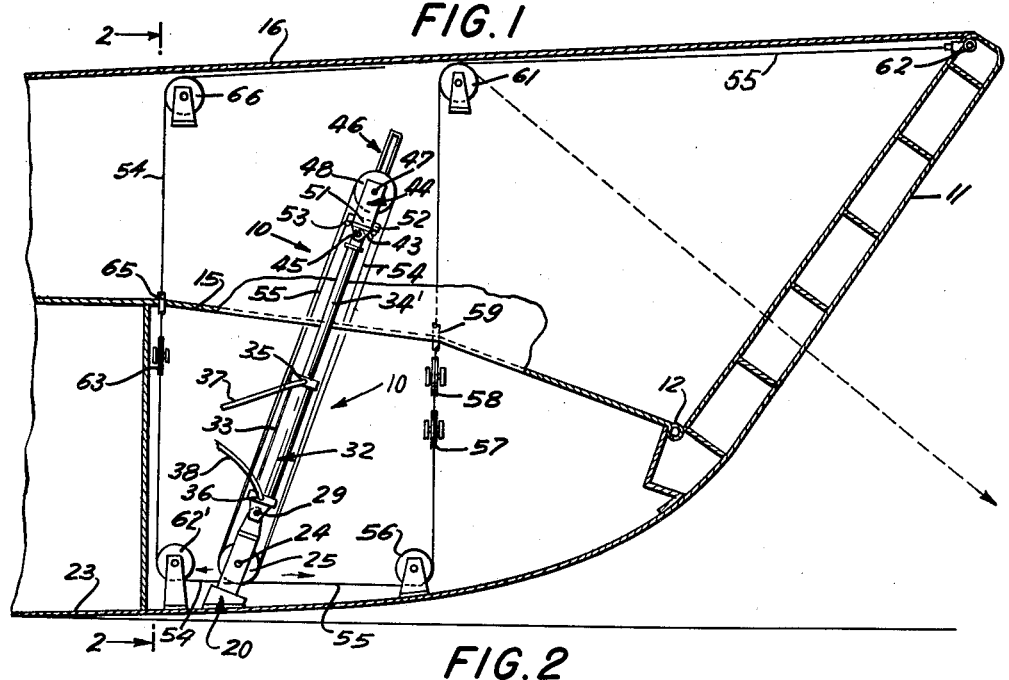
FIG. 1
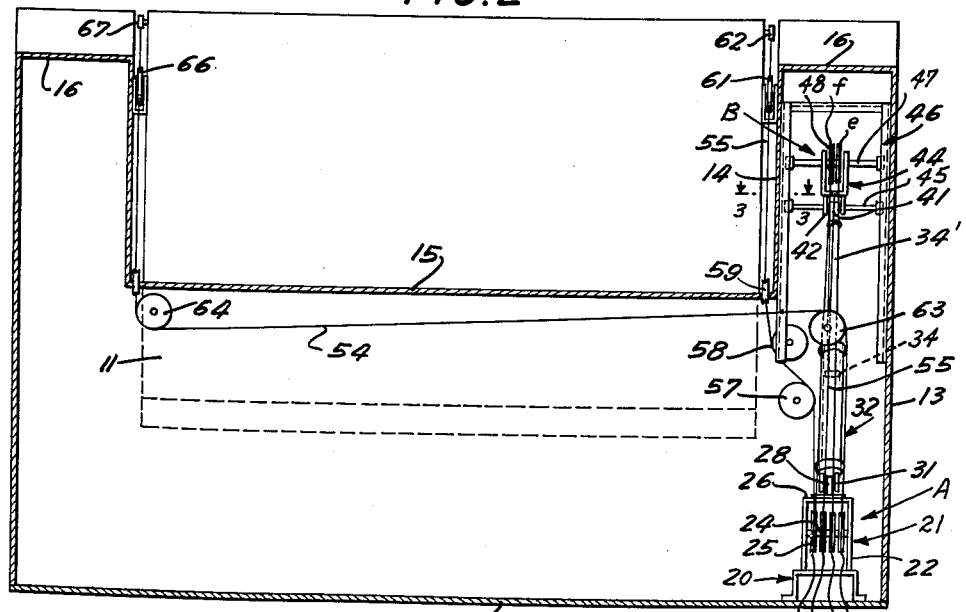
FIG. 2
FIG. 3
INVENTOR.
PHILIP RICHTER
BY
Dean, Fairbank & Hirsch
ATTORNEYS

United States Patent Office 3,078,075
Patented Feb. 19, 1963

3,078,075
LINE PULLER
Philip Richter, Bethlehem, Pa., assignor, by mesne assignments, to General American Transportation Corporation, Chicago, Ill., a corporation of New York
Filed June 3, 1960, Ser. No. 33,669
1 Claim. (Cl. 254—189)

It is among the objects of the invention to provide a line puller that is relatively small and compact and is especially suitable for use where space is at a premium, and which, without the need for elaborate and expensive control mechanism, will permit substantially infinite adjustment so that the line may be moved in any desired increments.

According to the invention, these objects are accomplished by the arrangement and combination of elements hereinafter described and more particularly recited in the claim.

In the accompanying drawings in which is shown one of various possible embodiments of the several features of the invention, FIG. 1 is a fragmentary side elevational view of a vessel in which the invention is illustratively incorporated, FIG. 2 is a sectional view taken along line 2—2 of FIG. 1, and FIG. 3 is a detail view taken along line 3—3 of FIG. 2.

Referring now to the drawings, the line puller 10 is illustratively shown incorporated in a landing craft of the type having a ramp 11 extending transversely across the bow thereof and pivotally mounted at its lower edge as by a hinge 12.

The line puller 10 is mounted adjacent one of the side walls 13 of the landing craft between said side wall 13 and a wall 14 rising from the deck 15 of the vessel to a catwalk 16 extending between the upper edges of walls 13 and 14, along the sides of the vessel.

As shown in the drawings, a substantially U-shaped bracket 21 has the ends of its legs 22 secured as by welding to the cross piece of a U-shaped mount 20 affixed to the hull 23 of the vessel and extending upwardly therefrom, desirably being inclined forwardly as shown in FIG. 1. Extending between the legs 22 of the bracket 21 is a shaft 24 which rotatably mounts a plurality of pulleys 25, illustratively four in number, said bracket and associated shaft and pulleys defining a sheave A.

Extending upwardly from the cross piece 26 of the bracket 21 is a finger 28 to which is pivotally connected, as at 29, a yoke 31 rigidly secured to one end of an actuator 32. The actuator 32, which illustratively is of the hydraulic type, comprises a cylinder 33 in which a piston 34 is slidably mounted, a piston rod 34' affixed at one end to said piston, extending through the other end of said actuator. The cylinder 33 has ports 35 and 36 leading thereinto on each side of the piston 34, to which a source of hydraulic fluid may be connected through lines 37 and 38.

The free end of the piston rod 34' has a finger 41 secured thereto, which is straddled by the legs 42 of a yoke 43 secured to the cross piece of a substantially U-shaped bracket 44.

Extending through the legs 42 of yoke 43 and the finger 41 pivotally to connect the same is a shaft 45, the ends of which ride in a track 46 defined by a pair of transversely aligned U-shaped channel members 47' secured respectively to the walls 13 and 14 and illustratively inclined from the vertical as shown in FIG. 1.

Extending between the legs of the bracket 44 is a shaft 47 which rotatably mounts pulleys 48, illustratively two in number, said bracket and associated shaft and pulleys also defining a sheave B. The ends of shaft 47 also ride in the track 46 defined by channel members 47'.

Extending outwardly from the cross piece 51 of bracket 44, at right angles to shaft 47, are fingers 52 and 53 to each of which one end of a cable 54, 55 is secured. The cables 54, 55 extend downwardly around pulleys 25b and 25c respectively, then upwardly around pulleys 48e and 48f respectively, then downwardly around pulleys 25a and 25d respectively, extending in opposed direction from said pulleys, the above pulley arrangement providing a 3:1 ratio, i.e., one inch movement will move the cables three inches.

The cable 55 extends around a pulley 56 secured to the hull 23 adjacent side wall 13 to the front of the line puller, then between pulleys 57 and 58 which move the cable 55 laterally inwardly, as shown in FIG. 2, thence through a chafing guide or pipe 59 on the deck and around a pulley 61 secured to the side wall 14, and is affixed at the free end, as at 62, to the upper end of the bow ramp 11 at one side thereof.

The cable 54 extends around a pulley 62' secured to the hull adjacent side walls 13 to the rear of the line puller, then around a pulley 63 so as to extend transversely across the vessel below the deck 23 thereof, then around a pulley 64 mounted adjacent the other side wall 14 of the vessel and through a chafing guide or pipe 65 in the deck and around a pulley 66 secured to said other side wall 13, and is affixed at its free end, as at 67, to the upper end of the bow ramp at the other side thereof.

In the operation of the line puller, when hydraulic fluid under pressure is forced into the port 36 of cylinder 33, the piston rod 34' will be extended to move the sheave B away from sheave A to the position shown in FIG. 1. As a result, tension will be applied to both of the cables 54 and 55, which will apply tension to the bow ramp 11 to which they are connected, to move the latter about its pivot 12 to closed position.

In a corresponding manner, when fluid under pressure is applied to the port 35, the sheaves A and B will be moved toward each other to permit lowering of said bow ramp 11 by reason of the weight thereto.

Since the amount of fluid under pressure forced into the actuator 32 may be precisely controlled, it is apparent that infinite adjustment may be afforded, which for many applications would be extremely important, such as when the line puller is used to lower heavy weights to a predetermined position.

As the line puller is relatively compact, it may be positioned in any desired location, and by means of a simple pulley arrangement, such as illustratively shown in the drawings, the cables may be directed to a desired location.

By reason of the pivotal connection of the sheaves to the actuator, as at 29 and 45, precise alignment is not required, as the pivotal connections will afford sufficient play.

Although the line puller has been illustratively shown incorporated in a landing craft, it is of course to be understood that it can be used in many other applications, such as part of the ship's boom to permit adjustment thereof over the hatchway from which cargo is to be removed.

It is also to be understood that although the ratio illustratively shown is three to one, by increasing the number of pulleys on each sheave the ratio may be correspondingly increased to provide greater cable movement with a line puller of a given length.

As many changes could be made in the above equipment, and many apparently widely different embodiments of this invention could be made without departing from the scope of the claim, it is intended that all matter contained in the above description or shown in the accompanying drawings shall be interpreted as illustrative and not in a limiting sense.

Having thus described my invention, what I claim as new and desire to secure by Letters Patent of the United States is:

A line puller comprising a pair of longitudinally spaced sheaves, each having pulley means thereon, a linear actuator comprising a hydraulic cylinder having a piston rod slidably mounted therein, the first of said sheaves being pivotally connected to one end of said piston rod and the second of said sheaves being pivotally connected to one end of said cylinder, a pair of transversely spaced guide tracks straddling the first of said sheaves, said sheaves each comprising a substantially U-shaped bracket having a shaft extending transversely therethrough, said shafts having said pulley means rotatably mounted thereon, said pivotal connection for said first sheave comprising a third shaft extending parallel to the associated shaft of said first sheave, the ends of said third shaft and the associated shaft of said first sheave being guided by said tracks and a cable secured at one end and encompassing the pulleys on said sheaves, whereby upon movement of said sheaves toward and away from each other, the cable will be correspondingly moved.

References Cited in the file of this patent
UNITED STATES PATENTS

| | | |
|---|---|---|
| 217,600 | Fensom | July 15, 1879 |
| 348,610 | Bassett | Sept. 7, 1886 |
| 469,585 | McAdam | Feb. 23, 1892 |
| 2,416,753 | Hicks | Mar. 4, 1947 |
| 2,772,010 | Buehring | Nov. 27, 1956 |